United States Patent [19]
Ishida et al.

[11] Patent Number: 4,918,541
[45] Date of Patent: Apr. 17, 1990

[54] IMAGE PROCESSING METHOD AND APPARATUS

[75] Inventors: Yoshihiro Ishida, Kawasaki; Yuji Nishigaki, Odawara; Naoto Kawamura, Yokohama, all of Japan

[73] Assignee: Canon Kabushiki Kaisha, Tokyo, Japan

[21] Appl. No.: 38,288

[22] Filed: Apr. 14, 1987

[30] Foreign Application Priority Data

Apr. 17, 1986 [JP] Japan ................................. 61-88610
Apr. 17, 1986 [JP] Japan ................................. 61-88611
Apr. 17, 1986 [JP] Japan ................................. 61-88612
Apr. 18, 1986 [JP] Japan ................................. 61-91098

[51] Int. Cl.⁴ .......................................... H04N 1/415
[52] U.S. Cl. .................... 358/433; 358/462; 358/467; 382/56
[58] Field of Search ............. 358/260, 261, 280, 467, 358/462, 261.3, 433; 382/46, 56; 364/518

[56] References Cited

U.S. PATENT DOCUMENTS

| | | | |
|---|---|---|---|
| 4,271,476 | 6/1981 | Lotspiech | 382/46 |
| 4,281,312 | 7/1981 | Knudson | 358/46 |
| 4,319,267 | 3/1982 | Mitsuya et al. | 358/46 |
| 4,791,680 | 12/1988 | Yokoe et al. | 358/56 |
| 4,809,350 | 2/1989 | Shimoni | 382/56 |

Primary Examiner—Edward L. Coles, Sr.
Attorney, Agent, or Firm—Fitzpatrick, Cella, Harper & Scinto

[57] ABSTRACT

An image processing apparatus comprising an image memory for holding image data in the form of a compressed and encoded image data block of a plurality pixels. It also includes a decoder for decoding the encoded data, a device for performing a one-dimensional transformation on the decoded data, and a compressor for encoding the performed result again.

34 Claims, 16 Drawing Sheets

F I G. 3A
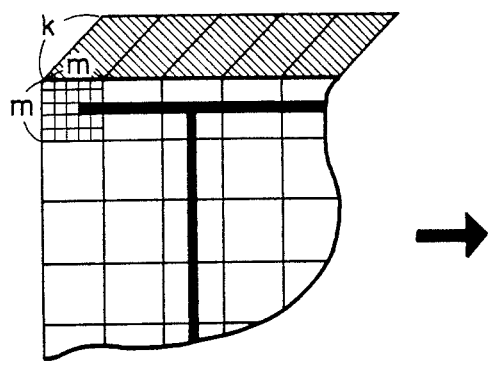
F I G. 3C
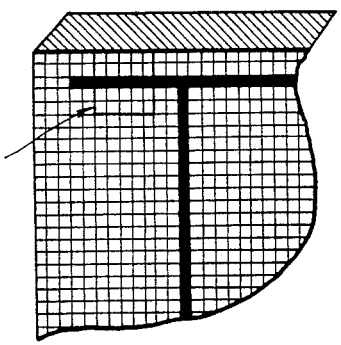
F I G. 3B
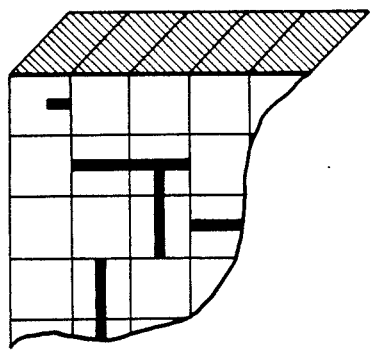
F I G. 3D
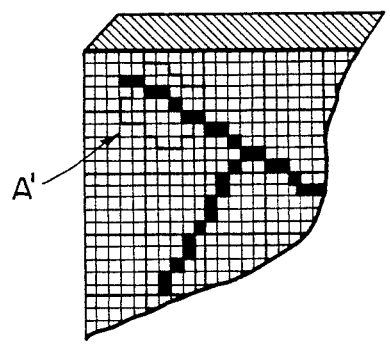

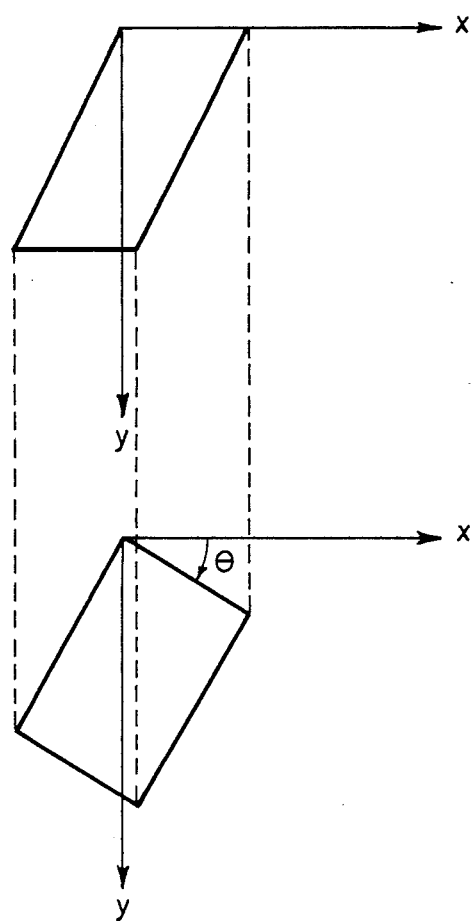
F I G. 4A

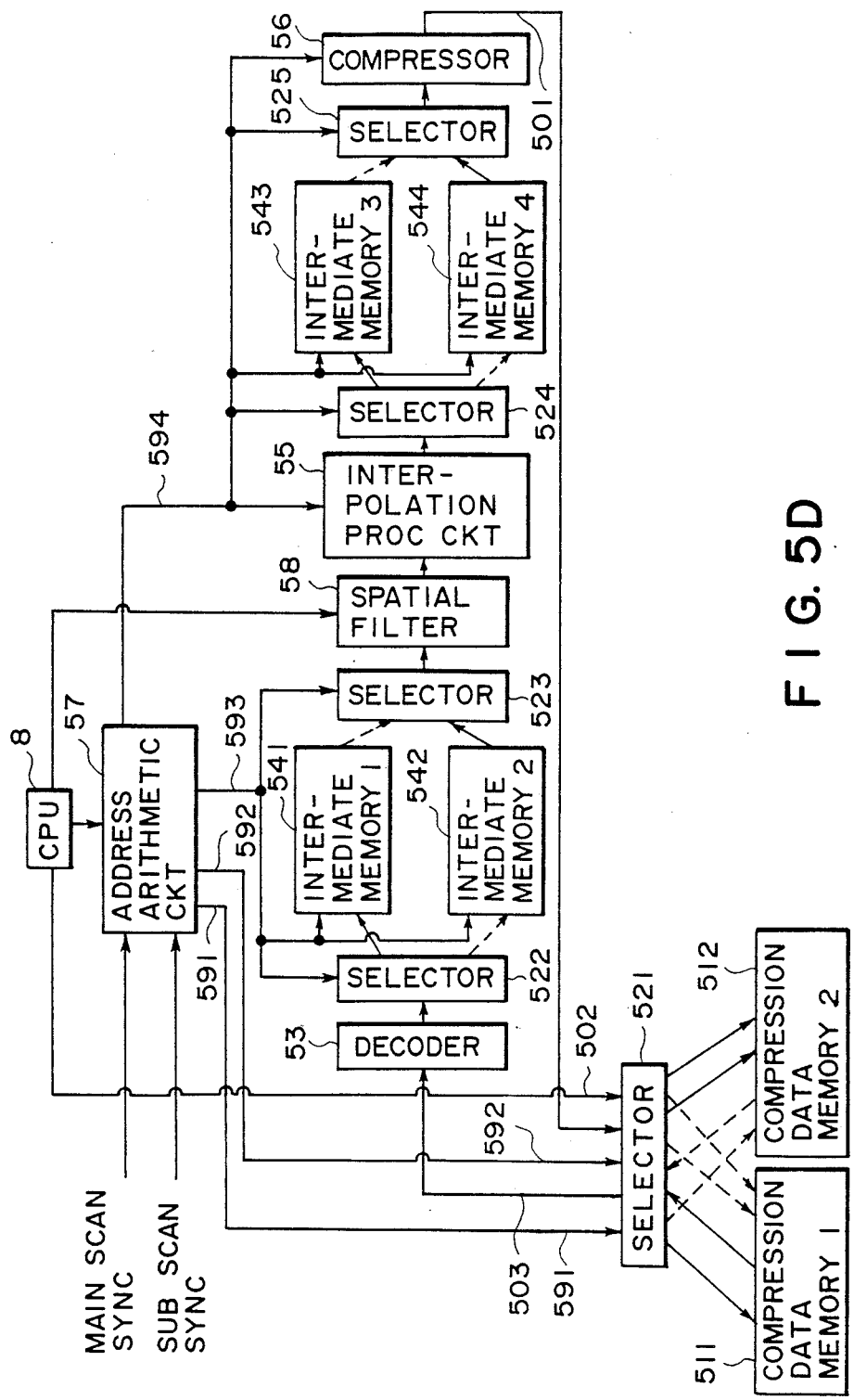
F I G. 5D

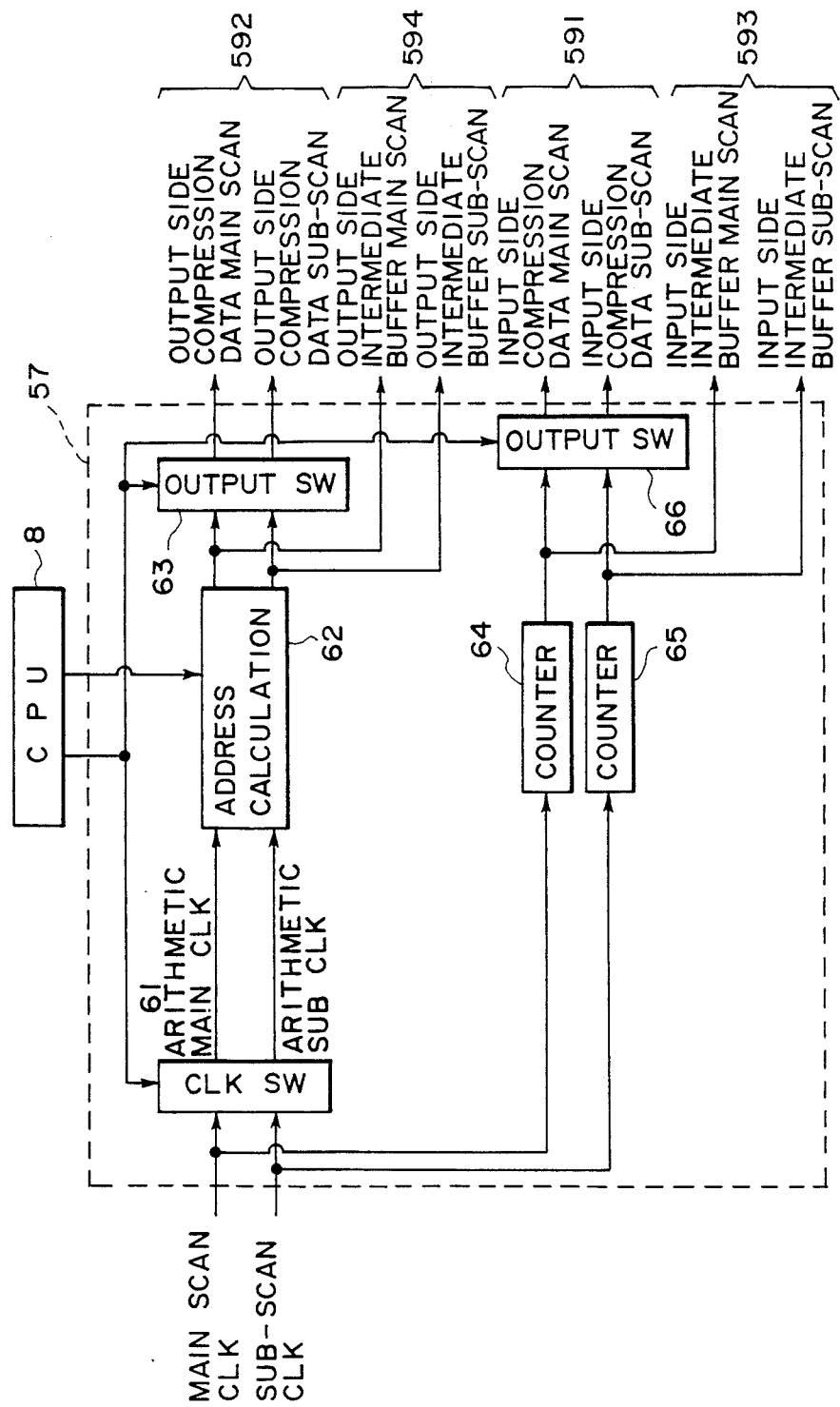
F I G. 6

IMAGE PROCESSING METHOD AND APPARATUS

BACKGROUND OF THE INVENTION

1. Field of the Invention

This invention relates to a method and apparatus for processing image data.

2. Related Background Art

Generally, an image processing apparatus requires the following two compiling functions:
1. High speed processing by hardware circuits; and
2. Software processing by a CPU.

The former is generally referred to as the pipeline processor by hardware. In this apparatus, data is processed for items which require a particular high speed and which have an image compiling function. The latter processing by a CPU is performed for items which are processed interactively with the operator (it may be permitted to take some time). Namely, the former pipeline processor mainly performs sequential processing of an image including, for example, an affine transformation (enlargement, reduction, movement, rotation) for determining the layout of the image, the spatial filter processing (emphasis on and smoothing of the image, etc.) and color conversion processing using a look-up table (LUT). The latter processing by a CPU involves generally complicated processing and processing difficult to systematize by hardware. Herein, it refers to cutting an image in any form, copying the cut image in another place, correcting portion of the image, etc. These processing is a creative one created by the operator and is permissible even if it may take some time. However, this should be highly functional.

In order to perform the above two compiling functions at maximum performance, it is necessary to first consider the system architecture of the compiling device. In order to perform both the processing operations with high function at high speeds, it is necessary to review the system scheme, the format of image data to be handled, the flow of signals, the analysis of the function, etc.

SUMMARY OF THE INVENTION

It is therefore an object of this invention to provide a method and apparatus capable of processing an image at high speed.

It is another object of this invention to provide a method and apparatus for performs compilation easily.

One aspect of this invention is to provide a method and apparatus for compressing into a fraction in a format easy to compile a large amount of image data produced when the image is read with high resolution, decoding such compressed data, and again compressing it.

Another aspect of this invention is to provide a method and apparatus for rotating an image by repeating a one-dimensional transformation (conversion) on the image three times.

Other objects features and advantages of this invention will be apparent from the following detailed description of the preferred embodiments, taken in conjunction with the accompanying drawings.

BRIEF DESCRIPTION OF THE DRAWINGS

FIGS. 3A-3D illustrate a method of rotating an image in this embodiment;

FIGS. 4A and 4B illustrate a method of rotating an image by one-dimensional transformation;

FIGS. 5A-5D are block diagrams of an image processing apparatus;

FIG. 6 shows an address arithmetic circuit;

DETAILED DESCRIPTION OF THE PREFERRED EMBODIMENTS

As a result of various studies, we have come to the following conclusions for a system architecture as a color image processing apparatus:

(1) For image compilation, image data should be stored in the form of compressed data.

(2) As the compression system, block encoding or vector quantization is preferable which has an m × m block as a—sign.

(3) In order to perform highly detailed image compilation, it is necessary to rewrite the image data in an m × m block.

In (1), in order to perform high-resolution, high-gradation image compilation, an immense quantity of image data must be dealt with. For example, when an A-4 sized page is read in color at 16 pels/mm, each including 8 bits/pixel, a quantity of data of about 48 Mbytes is produced in all for three red, (e.g. green and blue) colors. In order to perform the image compilation interactively in a highly functional manner it is important to use suitable techniques to compress. such color image data into a form easy to compile. To this end, we have come to the conclusion that the block encoding or vector quantization process pointed out at (2) is optimal. This is because a system which converts the m × m pixels of an image to fixed-length of codes brings about a large compression rate and because information on the positions of the image data is stored, so that compilation is easy.

When we obtain image data using such compression process, we have found that up to the data within an m × m compression unit, as shown at (3), must be written as a result of the compilation in order to perform highly detailed image compilation. Namely, as a result of compiling the collection of m × m unit code data obtained by vector quantization, it is necessary to change the value of codes depending on an item for compilation.

One embodiment of this invention will now be described in detail with reference to the drawings.

Figure 1:
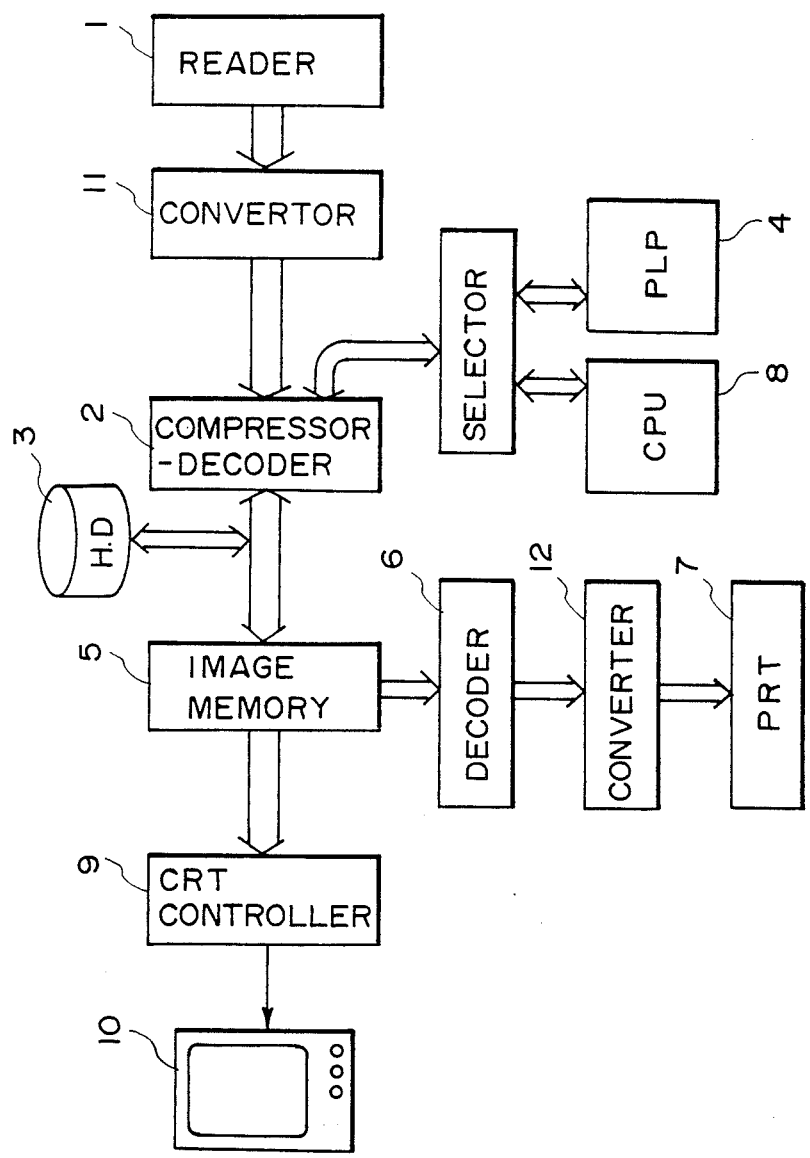
FIG. 1 is a schematic of an image processing apparatus of the first preferred embodiment.

FIG. 1 is a schematic of an image processing apparatus showing one embodiment of this invention. Image data (for example, red, green and blue 8-bit digital data) read by a reader 1 is converted by a converter 11 to a brightness (Y) signal and a color difference signal (I, Q) used for an NTSC signal. Such conversion is obtained by the following matrix computation, for example, on red, green and blue data:

$$\begin{bmatrix} Y \\ I \\ Q \end{bmatrix} = \begin{bmatrix} 0.3 & 0.59 & 0.11 \\ 0.6 & -0.28 & -0.32 \\ 0.21 & -0.52 & 0.31 \end{bmatrix} \begin{bmatrix} R \\ G \\ B \end{bmatrix}$$

When the coefficients of the transformation matrix are appropriately corrected in accordance with the color separation characteristic, $\gamma$ characteristic, etc., of the reader. The Y, I, Q signals are compressed by a compressor 2 to be described later in more detail and stored in a disk memory 3 for image data filing. The image data in the disk is read into an IC memory referred to as the image memory 5, processed and compiled. Basic processing is performed by a pipeline processor 4 constituted as hardware for the purpose of high speed processing.

The image data in image memory 5 is subjected to various processing, inclusive of correction, by CPU 8. The step of compilation is displayed on a color CRT 10 by a CRT controller 9 to monitor the state of compilation. The result of the compilation is returned from image memory 5 via a decoder 6 to the original image data. A converter 12 converts the image data to a color signal (yellow, magenta, cyan or black) corresponding to a color printer 7 and output to same.

Compression Coding

The compression of image data will now be described. It is known that if an image signal is separated into three color signals for brightness and color difference such as Y, I, Q and the spatial frequency of Y signal as brightness data is well held, deterioration in the image quality is not so large visually even if the spatial frequencies of I and Q signals as color difference signals may be limited to some extent (high frequency components may be cut).

A data compression method could be conceived in which color information is represented, for example, by the average value of I or Q signals in where m×m blocks (m is an integer) or the like to reduce the quantity of data on the color image. The block sizes for I, Q signals are selected to be 2×2, 4×4, 6×6 or the like in accordance with the image quantity required and the memory capacity allowable. For example, if the block size is 4×4, a memory capacity of 48 Mbytes for one A-4 sized page is reduced to a total of 18 Mbytes=16 Mbytes (not compressed) for the Y signal+2 Mbytes for the I, Q signals; the compression rate is about 2.7.

On the other hand, for the Y signal, a compression procedure is required which is different from those of I and Q signals and which holds a sufficient quantity of resolution data. A first procedure is block encoding.

Figure 2A:
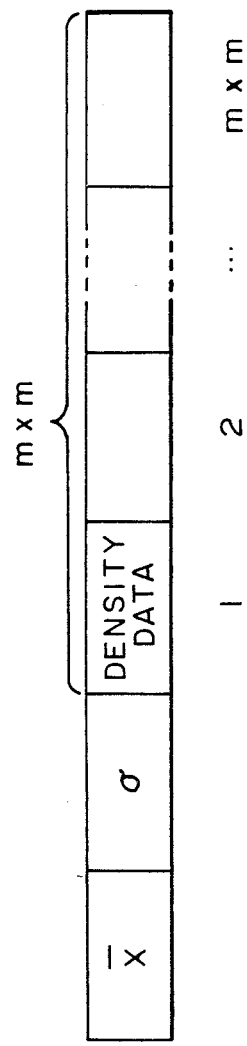
FIG. 2A illustrates a data format of block encoding.

According to this procedure, the average value x and the standard deviation $\sigma$ of the image data x in an m×m block are calculated. Information on the density of each pixel is represented by a few bits. For example, this can be realized by requantizing the value of $(x-\bar{x})/\sigma$. The format for this compressed data is as shown in FIG. 2A which includes data on the average value, standard deviation and pixel densities in this order. The respective densities in this order are in one-to-one correspondence to the positions of pixels in the block.

Figure 2B:
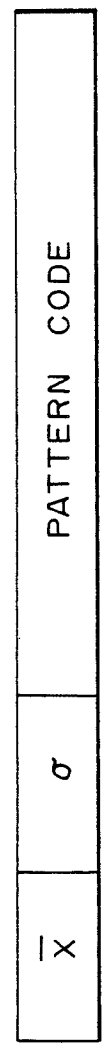
FIG. 2B illustrates a data format of vector quantization.

A second procedure is vector quantization of m×m pixels. According to this procedure, the image pixel data in an m×m block is represented by the average value x, standard deviation $\sigma$ and a code representing the image pattern to reduce the number of data. This compression data format is as shown in FIG. 2B.

The above uses resolution data for the Y signal alone and the average of data in the m×m block for the I, Q signals, but the I, Q signals may be encoded in a format similar to that of the Y signal.

In such compression format, an image of N× N pixels is divided into small m×m sections. In order to convert the m×m data to a code having a k-bit fixed length, the compressed image data requires a memory having an address space of N/m×N/m having a depth of k bits. Therefore, information on the address of an image is held, the random access performance such as retrieval or writing an image at any position is improved compared to the conventional system of compressing the variable length of codes such as MH, MR or MMR. Thus this system is optimal for compilation, etc.

Rotation of an Image

When image data is to be magnification-changed and rotated on the basis of the above compressed data, it is necessary to rewrite the compressed data itself.

FIGS. 3A-3D illustrate this. FIG. 3A shows divisions in the compressed data obtained when a plurality of image data units, each including m×m pixels, is compressed. The image data contained in each m×m unit is converted to a code (these m×m compressed pixels are hereinafter referred to as the pixel block).

FIG. 3B shows the result of rotation of the image for each pixel in which the character T is cut into pieces. In order to avoid this, it is necessary to decode the pixel blocks to restore the original image data, as shown in FIG. 3C, rotate each pixel, as shown in FIG. 3D, and then again compress the pixel data.

At this time, an m×m pixel unit A to be compressed, as shown in FIG. 3C, is modified, as shown by A' in FIG. 3D after rotation and extends over the boundary of bridges pixel units to be compressed newly.

Namely, in order to perform a highly detailed image compilation processing, the following successive conversions are required:

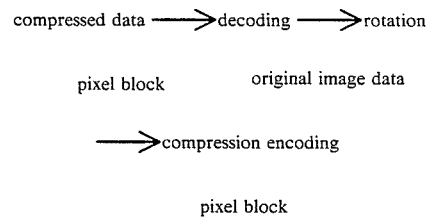

Now assume that an image is rotated. When the compressed image data is decoded into the original image data and rotated, the image data starts to move, so that a memory having a very large capacity for storing the data in the form of the original image data is required. In the worst case, an intermediate buffer is required having a capacity of 48 Mbytes which is as many as the original image data.

When two-dimensional transformation and spatial filtering of an image is directly performed in a two-dimension, the circuit used is disadvantageously more complicated than a one-dimensional processing circuit.

A method will now be described which can very simply realize the calculation including such decoding-spatial filtering→rotation→compression encoding, or decoding→rotation→spatial filtering→compression decoding.

First, a method of rotation will be described. Generally, rotation of any angle $\theta$ can be realized by the following affine transformation:

$$\begin{bmatrix} X \\ Y \end{bmatrix} = \begin{bmatrix} \cos\theta & -\sin\theta \\ \sin\theta & \cos\theta \end{bmatrix} \begin{bmatrix} x \\ y \end{bmatrix} \quad (1)$$

wherein $$\begin{bmatrix} x \\ y \end{bmatrix}$$

denotes the coordinates of an image before rotation, $$\begin{bmatrix} X \\ Y \end{bmatrix}$$

denotes the coordinates of an image after rotation, and $\theta$ is a rotated angle. By this two-dimensional transformation, the coordinates $$\begin{bmatrix} x \\ y \end{bmatrix}$$

of the image before rotation are at the address point of the image data (i.e., can be expressed by an integers) while the coordinates $$\begin{bmatrix} X \\ Y \end{bmatrix}$$

after rotation generally become irrational numbers. Therefore, in order to perform a rotation with high precision, it is necessary to calculate by two-dimensional inter-polation data on the address point $$\begin{bmatrix} X_i \\ Y_i \end{bmatrix}$$

(integer) of data after rotation from data on several non-integer coordinate $$\begin{bmatrix} X \\ Y \end{bmatrix}.$$

The data obtained by rotation, as shown in FIG. 3, is not filled regularly in m×m units, so that recompression is difficult without an intermediate buffer having a considerable capacity. Accordingly, the equation (1) for two-dimensional affine transformation is changed to the product of two x- and y-sense one-dimensional transformations as follows:

$$\begin{bmatrix} X \\ Y \end{bmatrix} = \begin{bmatrix} 1 & 0 \\ \tan\theta & 1/\cos\theta \end{bmatrix} \begin{bmatrix} \cos\theta & -\sin\theta \\ 0 & 1 \end{bmatrix} \begin{bmatrix} x \\ y \end{bmatrix} \quad (2)$$

$$= T_2 * T_1 \begin{bmatrix} x \\ y \end{bmatrix}$$

The coordinates are expressed by the one-dimensional transformation $t_1$ in the first, x sense as follows:

$$\begin{bmatrix} X' \\ Y' \end{bmatrix} = \begin{bmatrix} \cos\theta & -\sin\theta \\ 0 & 1 \end{bmatrix} \begin{bmatrix} x \\ y \end{bmatrix} \quad (3)$$

$$\begin{cases} X' = x\cos\theta - y\sin\theta \\ Y' = y \end{cases} \quad (4)$$

Figure 4B:
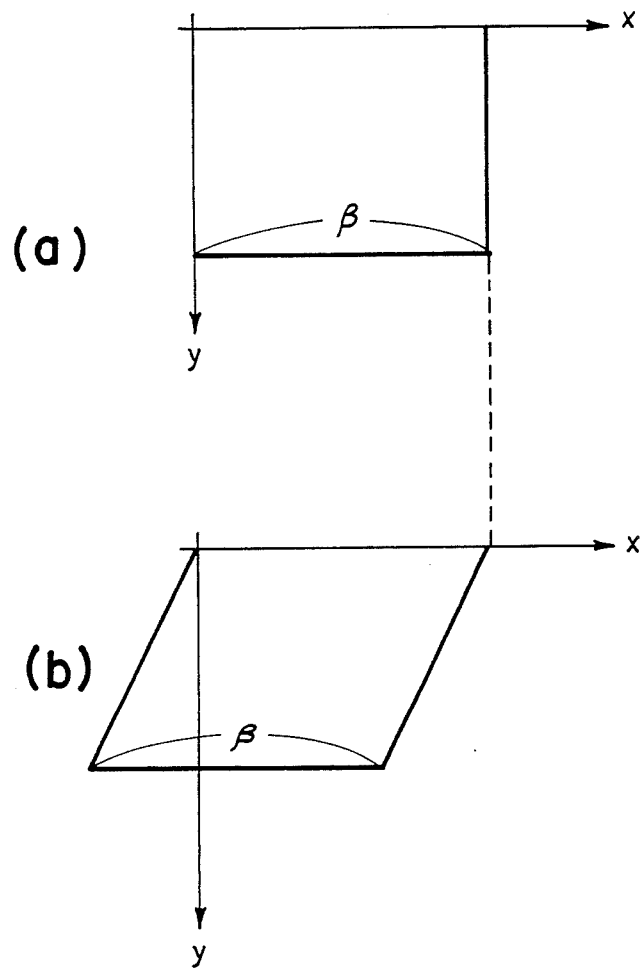

Namely, by one-dimensional transformation $T_1$, the value of y is unchanged and the width in the x sense is reduced by a factor of $\cos\theta$. Illustratively, a rectangle of FIG. 4A-a is changed as shown in FIG. 4A-b by one-dimensional transformation $T_1$ in the x sense. The coordinates transformation the second one-dimensional transformation $T_2$ in the y sense as follows:

$$\begin{bmatrix} X \\ Y \end{bmatrix} = \begin{bmatrix} 1 & 0 \\ \tan\theta & 1/\cos\theta \end{bmatrix} \begin{bmatrix} X' \\ Y' \end{bmatrix} \quad (5)$$

$$\begin{cases} X = X' \\ Y = X'\tan\theta + Y'\cos\theta \end{cases} \quad (6)$$

Namely, by the one-dimensional transformation $T_2$ in the y sense, as shown in FIGS. 4A-b and 4A-c, the value of x is unchanged and the width in the y sense is enlarged by a factor of $1/\cos\theta$, thereby resulting in an image rotated through an angle of $\theta$ as shown in FIG. 4A-(c).

As described above, according to the x-sense one-dimensional transformation $T_1$, when data for one x-sense line is read, the coordinates of data after transformation is on the line while data on the address points of the image after transformation can be obtained by one-dimensional interpolation. Thus, one x-sense line unit can be processed. Therefore, if the results of processing the one-dimensional transformations $T_1$ for m lines are collected, recompression in m×m units is easily possible. Similarly, for a y-sense one-dimensional transformation $T_2$, it is possible to read data for one y-sense line and process the data for that line. In this case, it is necessary to be able to access a memory (5 in FIG. 1), which stores the compressed data, in two x and y senses.

On the other hand, in the one-dimensional transformation of FIG. 4A-a to FIG. 4A-b, a contraction of an image occurs in the x sense while in the transformation of FIG. 4A-(b) to FIG. 4A-(c), an expansion of the image occurs in the y sense. Thus, two times of decoding - compression in the x and y senses result in a large deterioration in the image data. More specifically, once an image is contracted, the missing of image data occurs because the sample pitch for the image is constant. Even if the image data is enlarged, the missing data is not restored, so that the reproduced image includes data of a less quantity of information, free from high frequency components.

Thus in this embodiment, the second equation is transformed as follows:

$$\begin{bmatrix} X \\ Y \end{bmatrix} = T_3 * T_2 * T_1 \begin{bmatrix} x \\ y \end{bmatrix} \quad (2)\text{-}1$$

where $T_3 = T_1 = \begin{bmatrix} 1 & -\frac{1-\cos\theta}{\sin\theta} \\ 0 & 1 \end{bmatrix}$ $T_2 = \begin{bmatrix} 1 & 0 \\ \sin\theta & 1 \end{bmatrix}$ This transformation is characterized in:
(1) that there is no expansion and contraction of an image in one-dimensional transformation, and
(2) that, therefore, the quantity of data on the image is not lost although compression and decoding may be repeated.

This will be described by the operation of $T_3$ or $T_1$:

$$\begin{bmatrix} X \\ Y \end{bmatrix} = T_1 \begin{bmatrix} x \\ y \end{bmatrix}$$

$$= \begin{bmatrix} 1 & -\frac{1-\cos\theta}{\sin\theta} \\ 0 & 1 \end{bmatrix} \begin{bmatrix} x \\ y \end{bmatrix}$$

$$\therefore \begin{cases} X = x + \alpha \cdot y \quad \left[\text{where } \alpha = \frac{\cos\theta - 1}{\sin\theta}\right] \\ Y = y \end{cases}$$

This shows a mere one-dimensional-sense areaconstant transformation (hereinafter referred to as the shear) in an X-sense.

This is shown by the transformation from FIG. 4B-(a) to FIG. 4B-(b) wherein the width β is unchanged, so that this can be realized by simple hardware. Namely, it is only required to change the head address of rasters of the raster image. When the compressed data is decoded and sheared, it is only required to shift the head address of the decoded image data when same is stored in a line memory for at least m lines. Therefore, there occurs no missing of an image due to the contraction mentioned above. In addition, the size of the intermediate line buffer economically requires only the width of the image. (If expansion and contraction are to be performed, an intermediate buffer for data of more than the image width is needed.) It is to be noted that instead of equation (2) - 1 the following equation may be used:

$$\begin{bmatrix} X \\ Y \end{bmatrix} = T'_3 * T'_2 * T'_1 \begin{bmatrix} x \\ y \end{bmatrix} \quad (2)\text{-}2$$

where $T'_3 = T'_1 = \begin{bmatrix} 1 & 0 \\ \frac{1-\cos\theta}{\sin\theta} & 1 \end{bmatrix}$ $T'_2 = \begin{bmatrix} 1 & -\sin\theta \\ 0 & 1 \end{bmatrix}$ One-dimensional transformations T'$_1$, T'$_3$ becomes a y-sense shear and T'$_2$ become an x-sense shear. These transformations do not result in image expansion and contraction, so that processing similar to that applying in equation (2) - 1 is obviously possible.

The details of the transformation: compressed data→ decoding→rotation→compression decoding will be described on the embodiments shown in FIGS. 5–9.

Figure 5A:
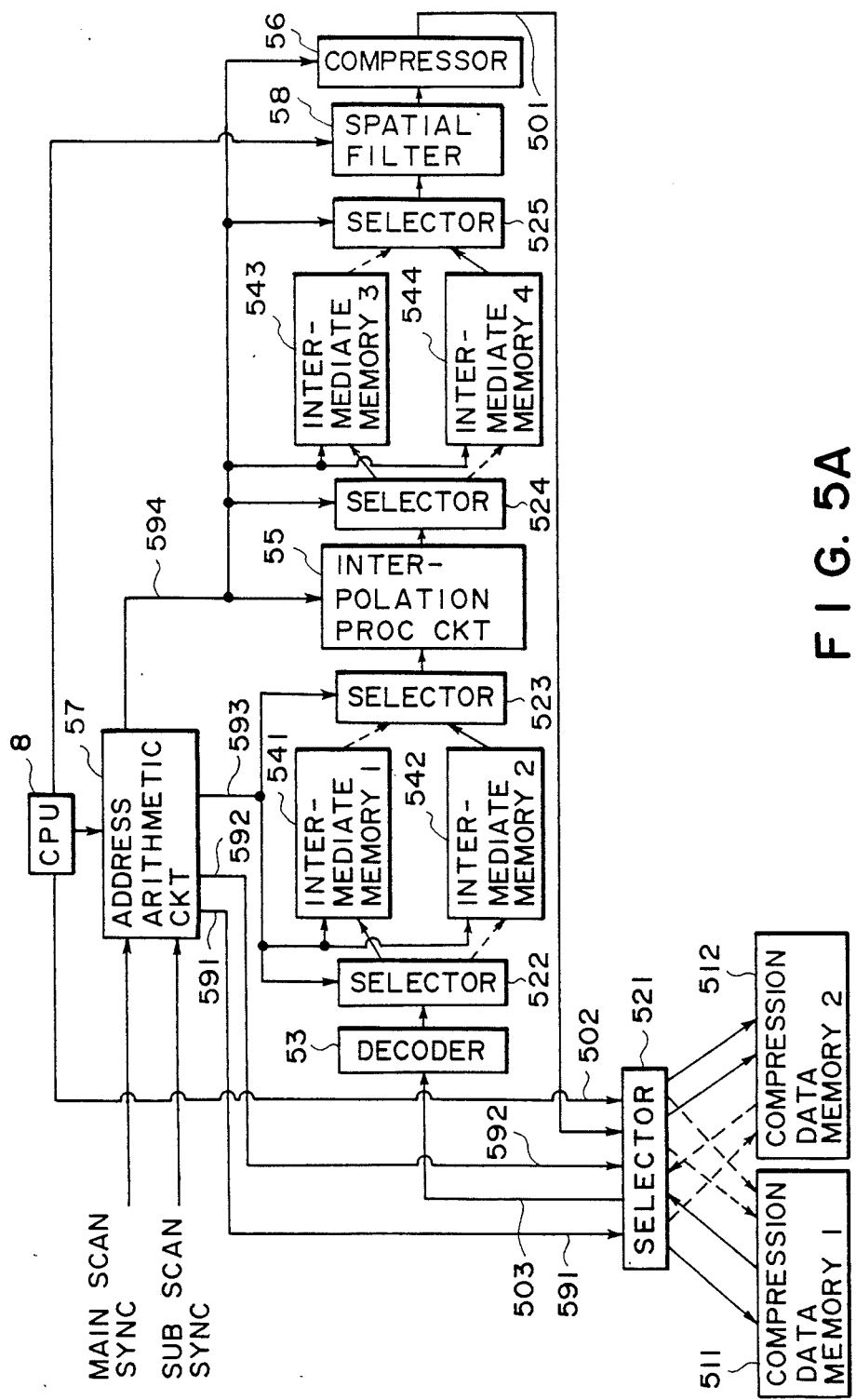

FIG. 5A is a block diagram of the entire circuit scheme to perform the compressed data→ decoding- →rotation→spatial filtering→compression encoding. The compressed data is divided into two areas 511, 512 for input data and for storage of the processed data. CPU 8 instructs a selector 521 to select a data area for input data prior to its processing. Selector 521 takes three different states: namely, in accordance with a signal 502 from CPU8, selector 521 selects one of compression data memories 1 and 2 (511 and 512). It connects the address line of the selected memory to an input data side memory address 591, the data line of the selected memory to an input side compressed data line 503, another address line of the selected memory to an output data side memory address 592, and the data line of the selected memory to an output side compressed data line 501. Further, it disconnects the address and data buses for both memories 511 and 512 to result in a high impedance state.

Hereinafter, description will be made on the assumption that selector 521 connects compression data memory 1 as an input data memory, and compression data memory 2 as an output data memory. An address arithmetic circuit 57 receives a main scan synchronous clock and a sub-scan synchronous clock to output an input data address 591 in the input compression data memory, an output data address 592 to the output compressed data memory to which the processed data is to be output, and addresses 593, 594 in the intermediate buffer which addresses will be required during the processing. Compression memory 511 outputs data corresponding to input data address 591 to the input side compression data line 503, decoder 53 decodes it and outputs the result via an selector 522 to intermediate memory 1 or 2 (541 or 542). Selector 522 reconnects intermediate memories 1 and 2 by toggling each time the value of address 593 amounts to a multiple of m. Selector 523 operates similarly to selector 522; in more detail, selectors 522 and 523 alternately connect data buses 541 and 542 so that when selector 522 connects intermediate memory 1, selector 523 connects intermediate memory 2, while when selector 522 connects intermediate memory 2, selector 523 connects intermediate memory 1.

Figure 9:
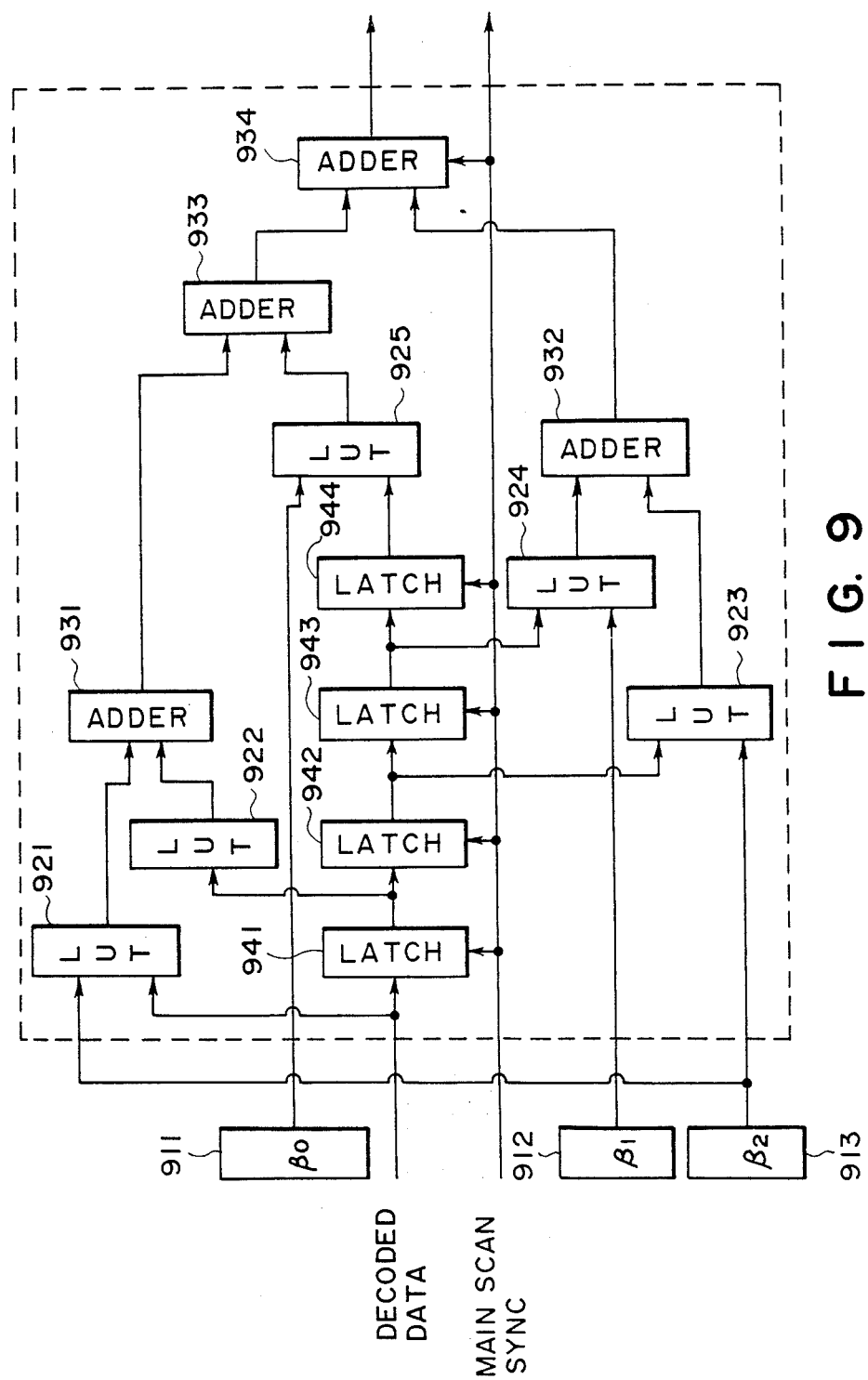
FIG. 9 is a circuit diagram for one-dimensional spacial filtering.

Now, description will be made in the case of m=4 as an example. Reference numeral 591 denotes an address bus. Each of the main and sub-scan addresses includes only bits larger than the third bit from the least significant bit (namely, the bit at the place of $2^2$. Input side intermediate buffer address 593 includes only the third bit from the least significant bit of the sub-scan address is input to selectors 522 and 523, and the main scan address alone is input to intermediate memories 1 and 2 (541 and 542). Intermediate memories 1 and 2 include a line buffer for 4 rasters each. Decoder 53 produces a raster output which is input via selector 522 to one of the intermediate memories. The same input side intermediate buffer address is input to both of the intermediate memories to write the decoded data at the appropriate address of one of the intermediate memories. On the other hand, decoded data preceding one line block is output from the respective four line buffers from the same main scan address of the other intermediate memory output via selector 523 to interpolation processing circuit 55 which receives the decimal fraction portion of the output side intermediate buffer main scan address 594 including an integer portion and a decimal fraction portion and prepares data interpolated from two successive data for each of the four line buffer outputs to output the interpolated data via selector 524 to intermediate memory 3 or 4 corresponding to the address defined by the integer of the address 594. Selector 524 and 525 constitute a selector pair which selects intermediate memories 3 and 4 by toggling similarly to selectors 522 and 523. Selectors 524 and 525 receive as a selective signal one bit which is the third bit from the least significant bit of the sub scan address of the output side intermediate buffer address 594. Intermediate memories 3 and 4 receive the main scan address of the same output side intermediate buffer address. One of these intermediate memories receives data from interpolation processing circuit 55. The other intermediate memory outputs the interpolated data preceding one line block for four rasters in a parallel manner via selector 525 to a one-dimensional spatial filtering circuit 58 which includes four one-dimensional spatial filters, as shown in FIG. 9, one corresponding to each raster. The output of filtering circuit 58 is input to an compressor 56. When compressor 56 has received data for four pixels from each of the 4 rasters, it outputs compressed data which is delivered via output compression data bus 501 to selector 521. Selector 521 outputs the data on data bus 501 to the address of compression data memory 2 (512) designated by output side compression data address 592.

The address arithmetic circuit 57 will now be described. As shown in FIG. 6, circuit 57 includes a clock switch 61, an address calculation unit 62, output switches 63, 66 and counters 64, 65. As described above, in the rotation, the relationship according to the equation (1) holds when the input and output side addresses are expressed by (x, y) and (X, Y). At this time, the calculation of the rotation is considered in two separate terms, as shown in equation (2). If the intermediate address is expressed by (X', Y') and the equation is separated as shown in equation (3) and (5), the equation can be rewritten as shown in equations (4) and (6). If an pixel defined by a yth sub scan clock pulse and an xth main scan clock pulse for rasters is handled as a pixel for (x, y), the following equations hold:

$$Y' = Y'(y) = y \quad (4)\text{-}1$$
$$X' = X'(x,y) = x\cos\theta - y\sin\theta$$
$$X'(0, 0) = 0 \quad (4)\text{-}2$$
$$X'(0, j+1) = (j+1) \cdot (-\sin\theta) \quad (4)\text{-}3$$
$$= j \cdot (-\sin\theta) + 1 \cdot (-\sin\theta)$$
$$= X'(0, j) + 1 \cdot (-\sin\theta)$$

$$X'(i+1, j+1) = X'(0, j+1) + (i+1)\cos\theta \quad (4)\text{-}4$$
$$= X'(0, j+1) + i \cdot \cos\theta + \cos\theta$$
$$= X'(i, j+1) + \cos\theta$$

Therefore, the calculation of equation (3) can be calculated only by counting sub-scan synchronous clock pulses, and not influenced by the number of main scan synchronous clock pulses which may enter between sub-scan synchronous clock pulses. Therefore, address calculation unit 62 counts up sub-scan synchronous clock pulses using a counter 76 to produce an output Y'. A value of $-\sin\theta$ is set in advance at 711 by CPU and an initial value of 0 is reset at a latch 731. An adder 721 adds the value held by 711 to the value held by 731 each time a sub scan clock pulse is input to adder 721, and outputs the result. Latch 731 latches the output of the adder as a new value and executes the calculation of equation (4) - 3 . A latch 732 holds an initial value of 0 reset by CPU. An adder 722 adds the value held by latch 732 to a value held by 712 each time a main scan clock pulse is input to adder 722 to perform the calculation of equation (4) - 4 . A selector 74 selects and outputs the output from latch 731 only when selector 74 receives a sub-scan clock pulse, and selects and outputs the output of other 722 otherwise. Latch 732 latches the output from selector 74 when it receives at least one of a main scan clock pulse and a sub-scan clock pulse to output as X' the result of the calculation of equation (4) - 3 or (4) - 4 selectively.

Quite similarly, in the following equations (6), $$X = X(X') = X' \quad (6)\text{-}1$$
$$Y = Y(X', Y') = X'\tan\theta + Y'/\cos\theta$$
$$Y(0, 0) = 0 \quad (6)\text{-}2$$

$$Y(i+1, 0) = (i+1)\tan\theta \quad (6)\text{-}3$$
$$= i \cdot \tan\theta + \tan\theta$$
$$= Y(i, 0) + \tan\theta$$

$$Y(i+1, j+1) = Y(i+1, 0) + (j+1) \cdot \frac{1}{\cos\theta} \quad (6)\text{-}4$$
$$= Y(i+1, 0) + j \cdot \frac{1}{\cos\theta} + \frac{1}{\cos\theta}$$
$$= Y(i+1, j) + \frac{1}{\cos\theta}$$

In this case, the discussion applying when the main and sub-scan synchronous clocks are interchanged with each other in equation (3) holds in the calculation of equation (5) in quite the same way. In this case, CPU 8 switches elements 61, 63, 66 in advance and sets the values of $\tan\theta$ and $1/\cos\theta$ at 711 and 712, respectively, as shown by FIG. 7B.

The reason why the compression data address and intermediate buffer address are provided on each of the input and output sides is that in the case of equation (3) the intermediate buffer puts the main and sub-scan side addresses of the compression data memory in correspondence to addresses as they are on the main and sub-scan sides while in the case of equation (5) the main and sub-scan side address directions are used in correspondence to the sub-and main scan sense addresses, respectively, of the intermediate buffers. Thus, although the intermediate buffers may be raster buffers, they can handle any of equations (3) and (5).

Figure 8:
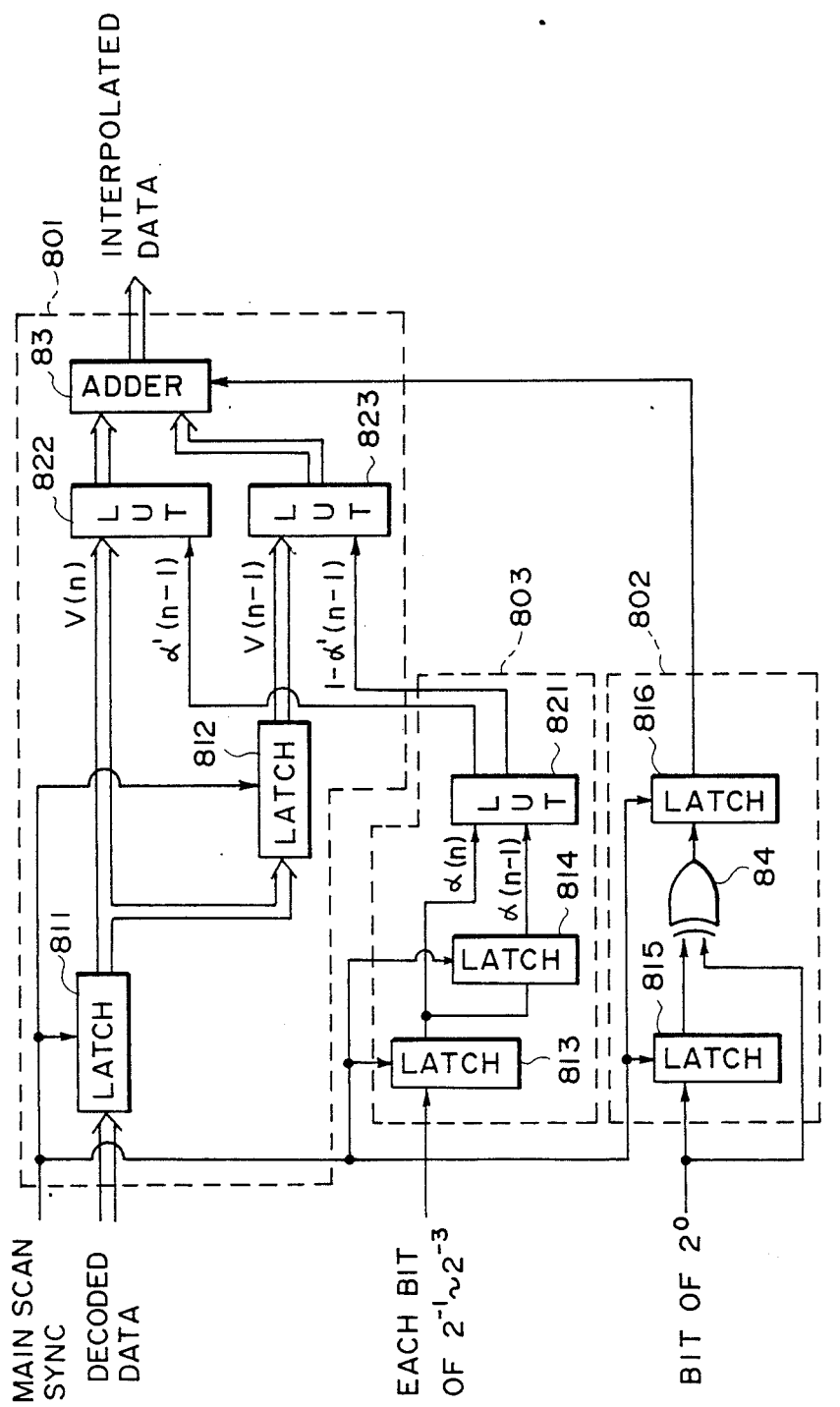
FIG. 8 is a circuit diagram for performing an interpolation.

The interpolation processing circuit 55 will now be described. This circuit receives decoded data, a total of 4 bits: namely, a decimal fraction portion (a bit at each of the places of $2^{-1}$, $2^{-2}$ and $2^{-3}$) and an integer portion (a bit at the place of $2^0$) of output side intermediate buffer address 594. It includes four circuit portions 801 constructed as shown in FIG. 8 and another portion, one circuit portion 801 corresponding to each of four rasters, and the circuit portions 801 operate in a parallel manner. The circuit of FIG. 8 includes latches 811, 812 for holding two successive ones of decoded data, a check portion 802 for checking whether the integer portion of the output side intermediate buffer address has changed, an output portion 803 for producing an interpolation coefficient from the decimal fraction portion of the output side intermediate buffer address. In check portion 802, a change in the integer portion of the output side intermediate buffer address is detected by checking whether or not the least significant bit (the bit at the place of $2^0$) of the integer portion has changed compared to the immediately preceding timing. Interpolation coefficient output portion 803 outputs, interpolation coefficients $\alpha'$, $1-\alpha'$ from the decimal fraction portion of the output side intermediate buffer address of two successive clock pulses, interpolation coefficients $\alpha'$, $1-\alpha'$ used in the following interpolation expression:

$$(1-\alpha')V(n)+\alpha'V(n-1) \qquad (7)$$

where V(i) is the ith clock pulse decoded data. Reference numeral 821 denotes a look-up table which receives the decimal fraction portion of the output side intermediate buffer address of two successive clock pulses and outputs $\alpha'$ and $1-\alpha'$.

Look-up tables 822 and 823 output $(1-\alpha')$ V(n) and $\alpha'$V (n−1), respectively, of equation (7) which are added by adder 83 to obtain the result of equation (7) which is then output via selector 524 to intermediate memory 3 or 4 synchronously with the output 84 from element 802.

The one-dimensional spatial filtering circuit of FIG. 9 will now be described. The output and input of the one-dimensional spatial filter corresponding to the ith pixel are denoted by V'(i) and V(i), respectively. V'(i) is then represented by $$V'(i)=\beta_2V(i-2)+\beta_1V(i-1)+\beta_0V(i)+\beta_1\cdot V(i+1)+\beta_2V(i2)$$

where $\beta_0$, $\beta_1$, $\beta_2$ are filter coefficients. CPU 8 sets $\beta_0$, $\beta_1$, $\beta_2$ before processing V' (i). The filtering circuit includes four latches connected in series and performing a latch operation in response to a main scan synchronous clock pulse. Latches 942-944 latch the values latched by the corresponding preceding latches to thereby provide V(i−2) V(i−1), . . ., V(i+2). Look-up tables 921-925 receive corresponding filter coefficients ($\beta_2$, $\beta_1$, $\beta_0$) and corresponding image data V, and output the product thereof. Others 931-934 add corresponding latch outputs sequentially to provide V'.

In the above description, intermediate memories 1, 2 and 3, 4 each are a line memory including a raster buffer for four rasters. If selectors 522, 523 and 524 and 525 are arranged to be switched at every 4 clock pulses of the main scan clock, memories for four pixels may be handled as four buffers.

Figure 5B:
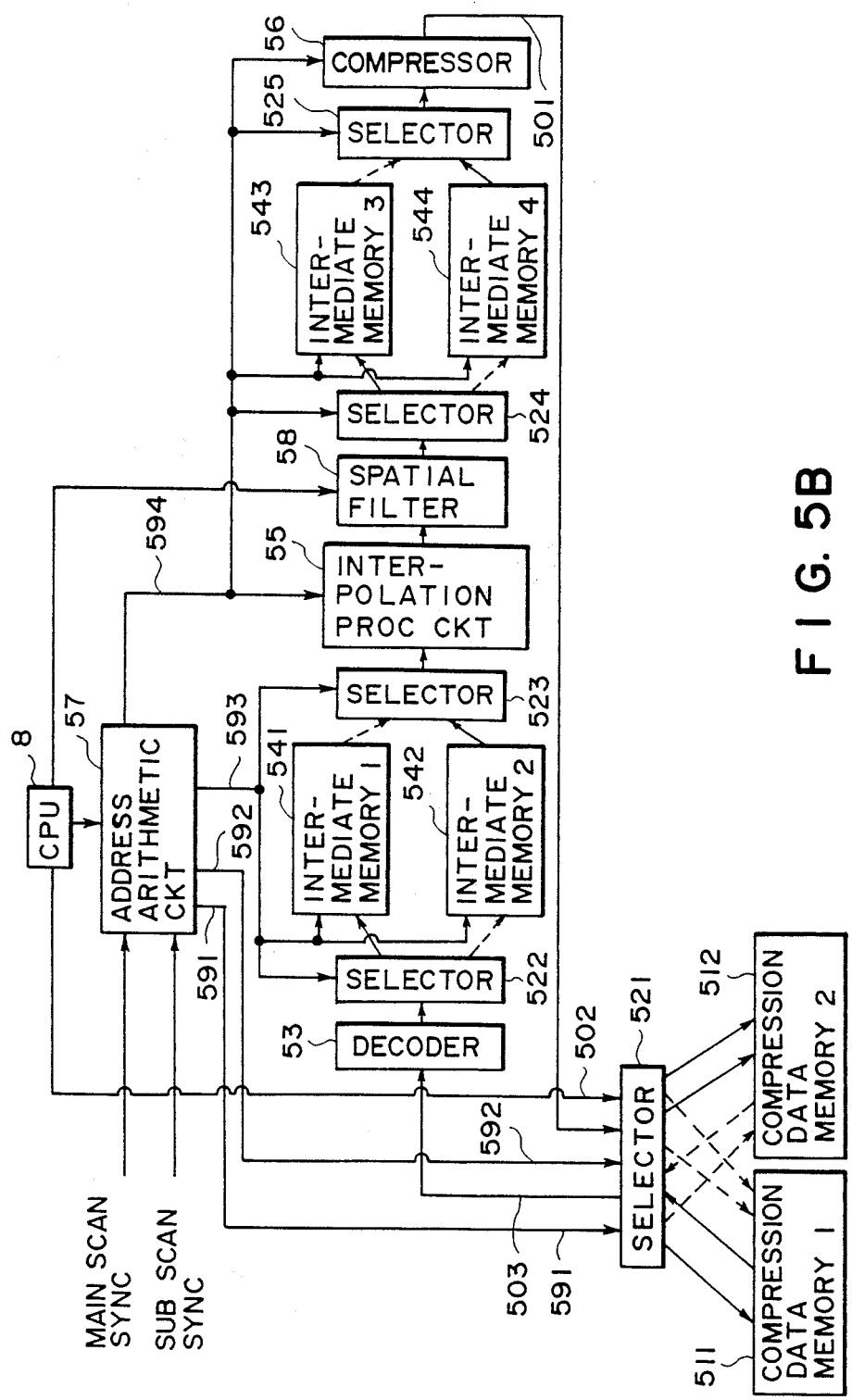
Figure 5C:
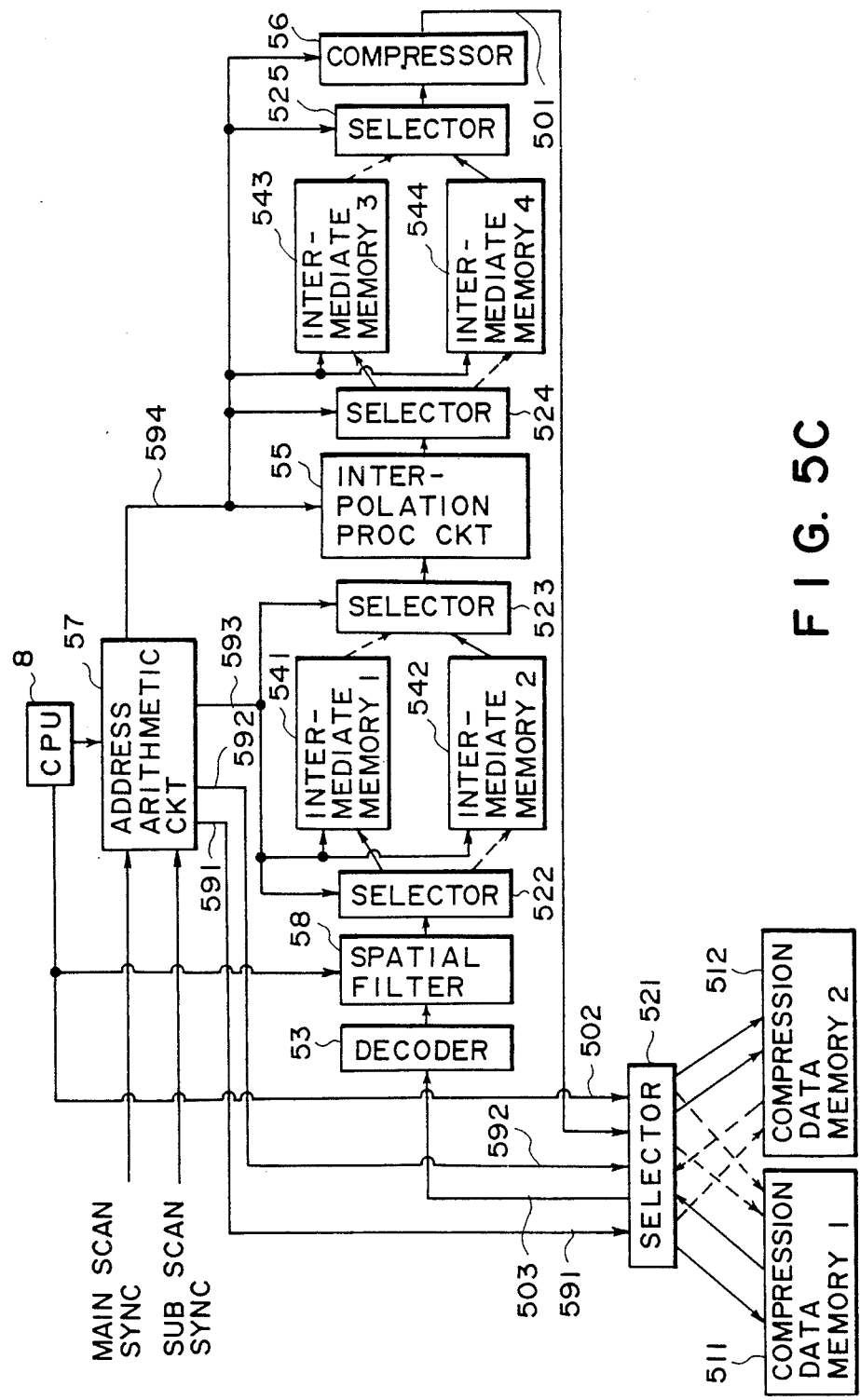

The one-dimensional spatial filtering circuit is not necessarily required to be placed at the position shown in FIG. 5A. It may be placed at any position in the flow of data from the decoder to the compressor. For example, it may be placed, as shown in FIGS. 5B-5D. In these cases, the circuit may take a structure as shown in FIG. 9 and operate similarly.

The details of the conversion: compression data→ decoding→rotation→compression decoding or compression data→decoding→spatial filtering →compression decoding will be described with reference to the embodiment of this invention shown in FIGS. 10A, 10B. In FIGS. 10 and 5, elements having like functions are given like reference numerals.

Figure 10A:
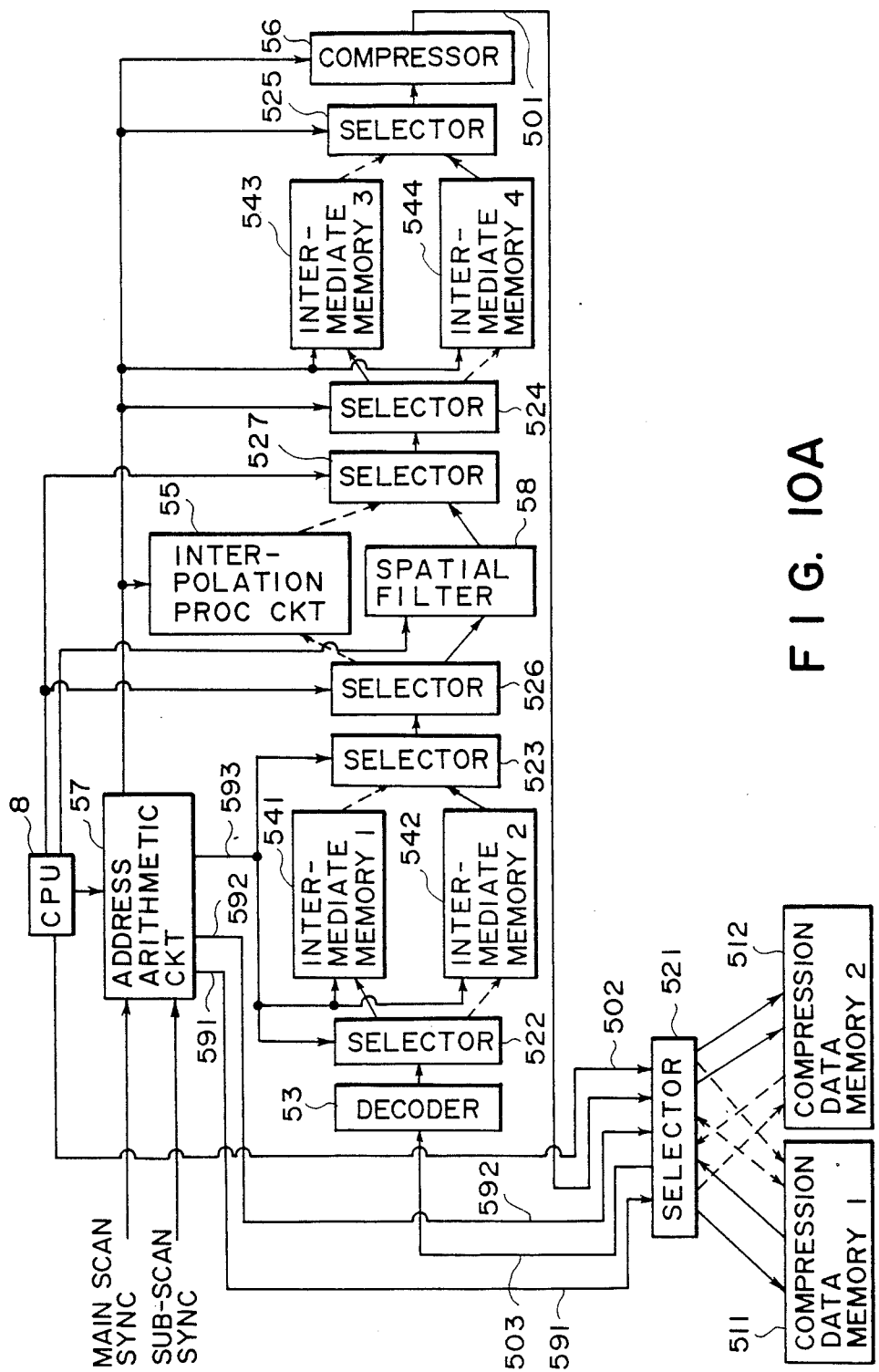
FIGS. 10A and 10B are block diagrams of an image processing apparatus of other embodiments.

FIG. 10A is a block diagram of the entire circuit scheme to perform the compressed data→decoding- →rotation→spatial filtering→compression coding. The compressed data is divided into two areas 511, 512 for input data and for storage of the processed data. CPU 8 instructs a selector 521 to select a data area for input data prior to its processing. Selector 521 takes three different states; namely, in accordance with a signal 502 from CPU 8, selector 521 selects one of compression data memories 1 and 2 (511 and 512). It connects the address line of the selected memory to an input data side memory address 591, the data line of the selected memory to an input side compressed data line 503, another address line of the selected memory to an output data side memory address 592, and the data line of the selected memory to an output side compressed data line 501. Further, it disconnects the address and data buses from both memories 511 and 512 to result in a high-impedance state.

Hereinafter, description will be made on the assumption that selector 521 connects compression data memory 1 as an input data memory, and compression data memory 2 as an output data memory. An address arithmetic circuit 57 receives a main scan synchronous clock and a sub-scan synchronous clock to output an input data address 591 in the input compression data memory, an output data address 592 to the output compression data memory to which the processed data is to be output, and addresses 593, 594 in the intermediate buffer which addresses will be required during the processing. Compression memory 511 outputs data corresponding to input data address 591 to the input side compression data line 503, decoder 53 decodes it and outputs the result via an selector 522 to intermediate memory 1 or 2 (541 or 542). Selector 522 reconnects intermediate memories 1 and 2 by toggling each time the value of address 593 amounts to a multiple of m. Selector 523 operates similarly to selector 522; in more detail, selectors 522 and 523 alternately connect data buses 541 and 542 so that when selector 522 connects intermediate memory 1, selector 523 connects intermediate memory 2, while when selector 522 connects intermediate memory 2, selector 523 connects intermediate memory 1.

Now, description will be made in the case of m =4 as an example. Reference numeral 591 denotes an address bus. Each of the main and sub-scan addresses includes only bits larger than the third bit from the least significant bit (namely, the bit at the place of $2^2$). Input side intermediate buffer address 593 includes only the third bit from the least significant bit of sub-scan address is input to selectors 522 and 523, and the main scan address alone is input to intermediate memories 1 and 2 (541 and 542). Intermediate memories 1 and 2 include a line buffer for 4 rasters each. Decoder 53 produces a raster output which is input via selector 522 to one of the intermediate memories. The same input side intermediate buffer address is input to both of the intermediate memories to write decoded data at the appropriate address of one of the intermediate memories. On the other hand, decoded data preceding one line block is output from the respective four line buffers from the same main scan address of the other intermediate memory output via selector 523 to selector 526. Selector 526 is set in advance by CPU 8 and selects one of interpolation processing circuit 55 and spatial filter 58 and supplies the output from selector 523 to the selected one of elements 55 and 58. Like selector 526, selector 527 selects one of elements 55 and 58 in advance in accordance with the command from CPU 8 and supplies the output of the selected one of elements 55 and 58 to selector 524. In this case, selectors 526 and 527 are set to select the same one of elements 526 and 527. Interpolation processing circuit 55 receives the decimal fraction portion of the output side intermediate buffer main scan address (including an integer portion and a decimal fraction portion) at 594 and prepares data interpolated from two successive data for each of the four line buffer outputs, and provides the data via selectors 527, 524 to intermediate memory 3 or 4 corresponding to the address defined by the integer portion of the address 594. The one-dimensional spatial filtering circuit 58 is constituted by four one-dimensional spatial filters 4 shown in FIG. 9, one filter corresponding to each raster. Each raster is subjected to one-dimensional spatial filtering and the resulting output is supplied via selectors 527, 524 to intermediate memory 3 or 4. Selectors 524, 525 constitute a selector pair which selects intermediate memory 3 or 4 by toggling as in the selectors 522, 523. Selectors 524 and 525 receive as a selective signal the third bit from the least significant bit in the sub-scan address of the output side intermediate buffer address 594. Intermediate memories 3 and 4 receive the main scan address of the same output side intermediate buffer address. One of memories 3 and 4 receives the data from the interpolation processing circuit or the data from the one-dimensional spatial filtering circuit. The other intermediate memory supplies the interpolated data preceding one line block or the data from the one-dimensional spatial filtering circuit via selector 525 to compressor 56 in such a manner that the data for 4 rasters is supplied in parallel. When compressor 56 has received data for 4 pixels from the respective 4 rasters, it outputs the compressed data via an output compression data bus 501 to selector 521 which then outputs the data on data bus 501 to an address of compression data memory 2 (512) designated by the output side compression data address 592. In this embodiment, the details of the address conversion circuit, interpolation processing circuit and one-dimensional spatial filtering circuit are the same as those in FIGS. 6-9.

Figure 7A:
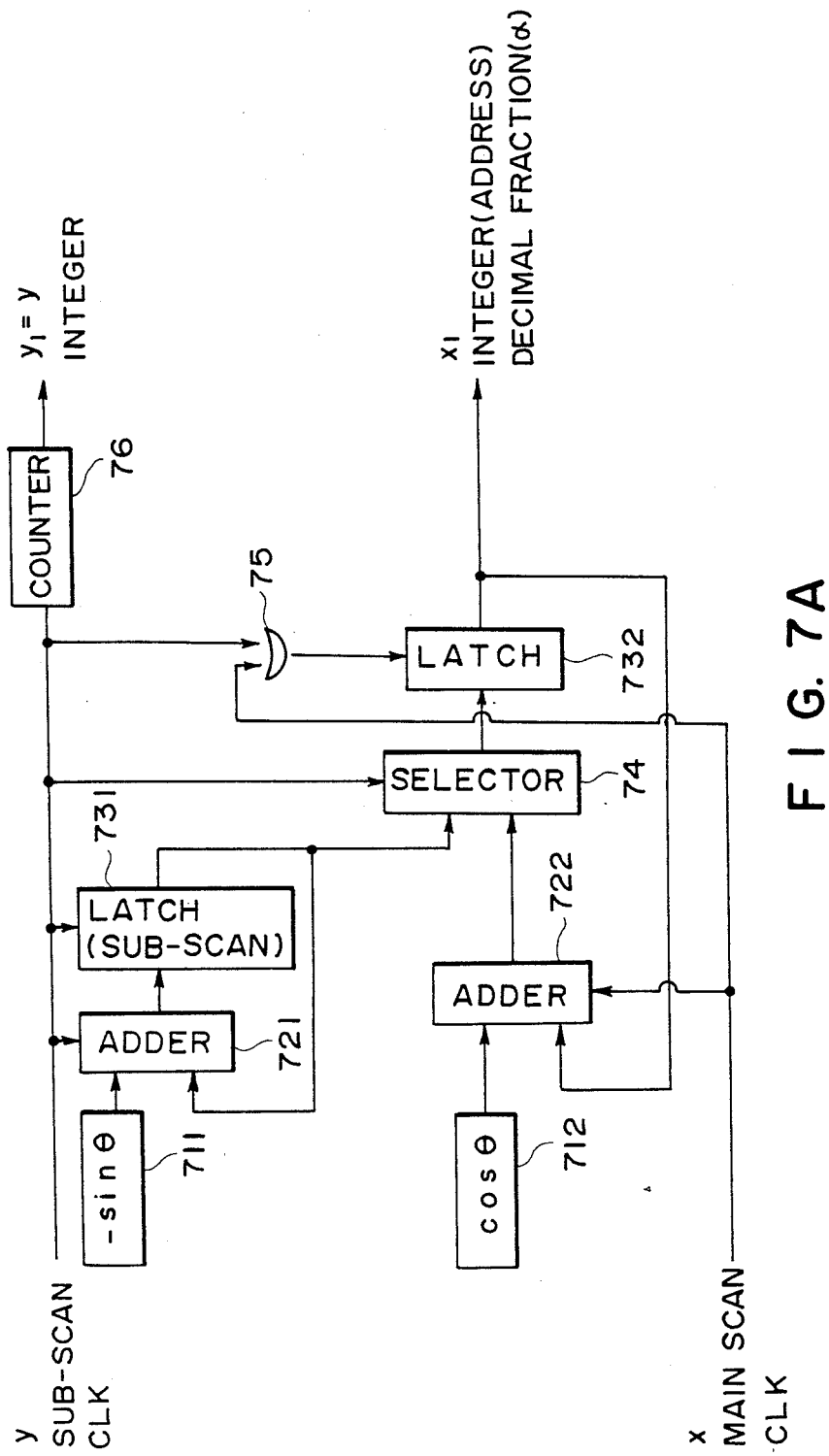
FIGS. 7A and 7B are circuit diagrams of an address calculation unit.
Figure 7B:
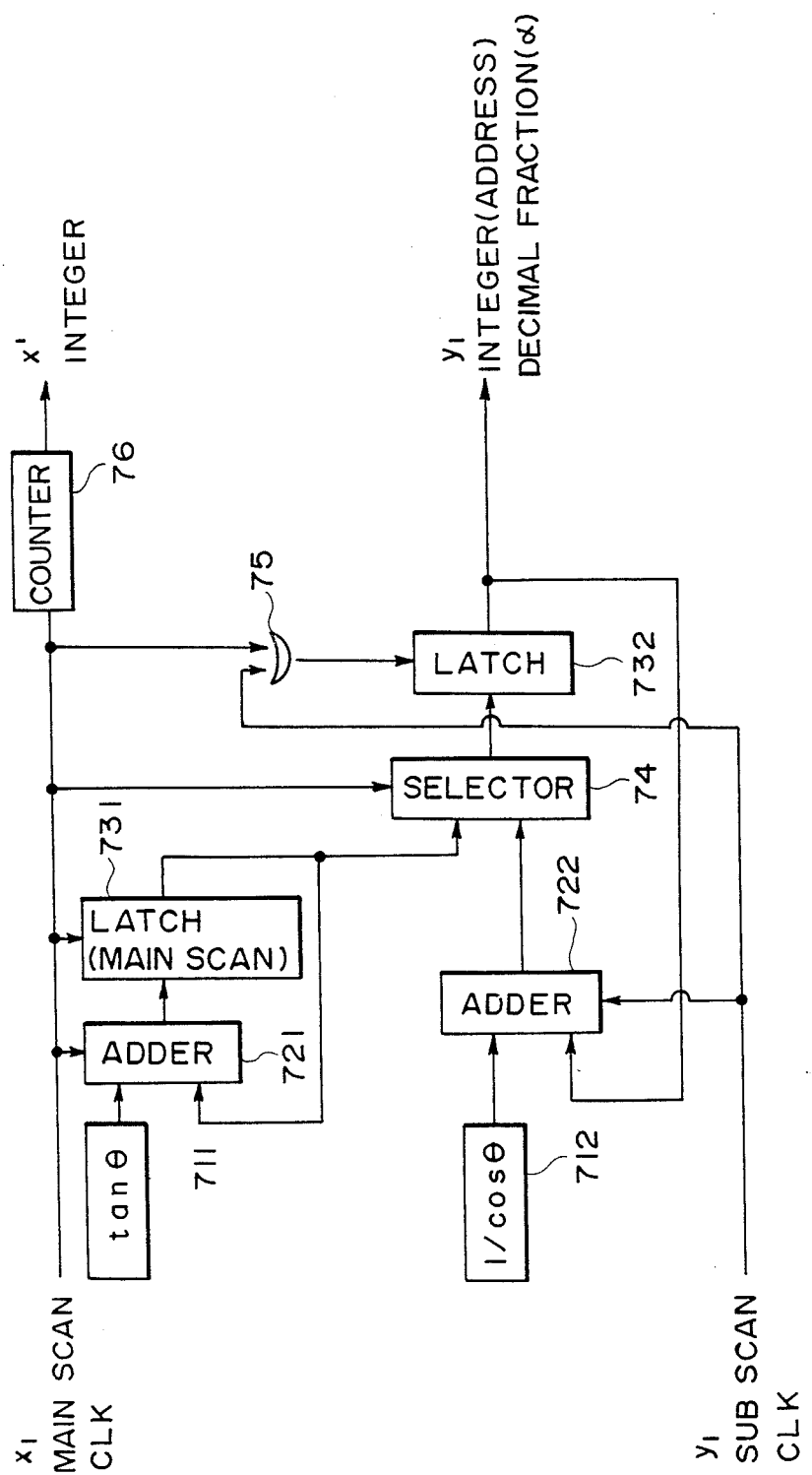

During execution of the one-dimensional spatial filtering, CPU 8 sets 0 and 1 at elements 711 and 712, respectively, of FIG. 7.

Figure 10B:
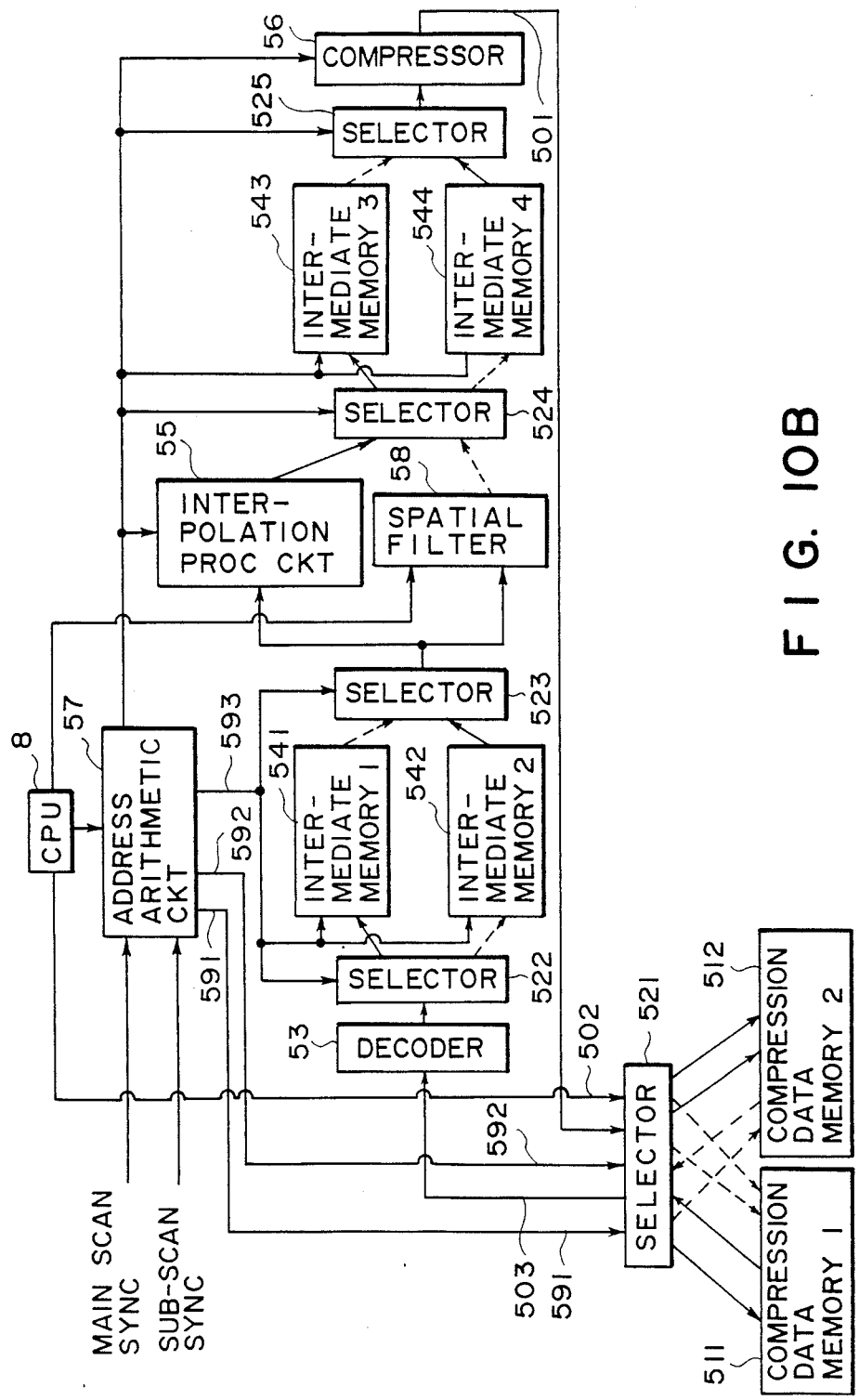

It may, of course, be arranged that in FIG. 10A, selector 526 is removed, the output of selector 523 is input to both the element 55 and 58, and one of the outputs of elements 55 and 58 is selected, as shown in FIG. 10B.

In the above respective embodiments, compression data memories 1 and 2 have the same physical structure and can be used as an input compression data memory when the data is read in and as an out-put compression data memory when the data is written, in a time division manner. When input compression data is to be read, it is read into the intermediate memory. When the data is to be written, it is clear from equations (3) and (5) that the data is not output to an input data area other than the data area into which data has been read previously.

As described above, the compression image data can easily be rotated.

While the present invention has been described with reference to rotation of data in this embodiment, it may be applicable to other processing such as data magnification.

As described above, this invention processes an image on the basis of compressed encoded image data with high speed in a highly detailed manner using simple hardware.

It is to be noted that this invention is not limited to the above embodiments. Various changes and modifications could be made by those skilled in the art within the scope of the claims.

What is claimed is:

1. An image processing apparatus comprising:
    enter means for entering a page of image codes which are obtained by compressing a page of image data;
    decode means for decoding the image codes entered by said enter means and generating image data;
    process means for image conversion processing the image data generated by said decode means, before the decode of the page of the image codes by said decode means is completed; and
    compression means for compressing the image data processed by said process means, before the process of the page of the image data by said process means is completed.

2. An apparatus according to claim 1, wherein said process means processes the image data generated by said decode means and corresponding to plural lines.

3. An apparatus according to claim 2, wherein said process means further comprises buffer memory means which stores the image data geberated by said decode means and corresponding to the plural lines.

4. An apparatus according to claim 1, wherein said process means processes the image data generated by said decode means so as to rotate an image.

5. An apparatus according to claim 1, wherein said enter means enters the image codes obtained by compressing the image data of each block which block is obtained by dividing the page of the image data into the plural blocks.

6. An apparatus according to claim 1, wherein said enter means comprises image memory means for storing the page of the image codes.

7. An apparatus according to claim 1, further comprising buffer memory means for storing the image data processed by said process means and corresponding to plural lines.

8. An image processing apparatus comprising:
    first memory means for storing a page of image codes which are obtained by compressing a page of image data;
    decode means for decoding the image codes read out from said first memory means and generating image data;
    process means for processing the image data generated by said decode means, before the decode of the page of the image codes by said decode means is completed;
    compression means for compressing the image data processed by said process means and generating image codes; and
    second memory means for storing the page of the image codes generated by said compression means.

9. An apparatus according to claim 8, wherein said process means processes the image data generated by said decode means and corresponding to plural lines.

10. An apparatus according to claim 9, wherein said process means further comprises buffer memory means which stores the image data generated by said decode means and corresponding to the plural lines.

11. An apparatus according to claim 8, wherein said process means processes the image data generated by said decode means so as to rotate an image.

12. An apparatus according to claim 8, where in said first and second memory means store the image codes obtained by compressing the image data of each block which block is obtained by dividing the page of the image data into plural blocks.

13. An apparatus according to claim 8, wherein said compression means compresses the image data processed by said process means, before the process of said process means for the page of the image data is completed.

14. An apparatus according to claim 8, wherein said process means filter processes the image data generated by said decode means.

15. An apparatus according to claim 8, wherein said decode means can decode the image codes read out from said second memory means.

16. An image processing apparatus comprising:
    image memory means for storing at least one page of image codes which are obtained by compressing image data;
    decode means for decoding the image codes read out from said image memory means and generating image data;
    process means for processing the image data generated by said decode means, in accordance with one of plural manners; and
    compression means for compressing the image data processed by said process means and generated image codes,
    wherein said image memory means is adapted to store the image codes generated by said compression means,
    said decode means decodes the image code which have been already processed according to the one of the plural manners and have been stored in said image memory, and
    said process means processes the image data generated by said decode means, in accordance with another manner.

17. An apparatus according to claim 16, wherein said process means processes the image data generated by said decode means and corresponding to plural lines.

18. A apparatus according to claim 17, wherein said process means further comprises buffer memory means which stores the image data generated by said decode means and corresponding to the plural lines.

19. An apparatus according to claim 16, wherein said process means processes the image data generated by said decode means so as to rotate an image.

20. An apparatus according to claim 16, wherein said image memory means stores the image codes obtained by compressing the image data of each block which block is obtained by dividing the page of the image data into the plural blocks.

21. An apparatus according to claim 13, wherein said compression means compresses the image data processed by said process means, before the process of said process means for the page of the image data is completed.

22. An apparatus according to claim 19, wherein said process means processes the image data in first and second manners respectively relating to x- and y-axis directions for the image rotation.

23. An apparatus according to claim 22, wherein said process means further processes the image data in a manner which is to correct an image area in the image rotation.

24. An apparatus according to claim 16, wherein said process means filter processes the image data generated by said decode means.

25. An image processing apparatus comprising:
    enter means for entering a page of image codes which are obtained by compressing image data;
    decode means for decoding the image codes entered by said enter means and generating image data;
    process means for processing the image data generated by said decode means, in accordance with one of plural manners; and
    compression means for compressing the image data processed by said process means and generating image codes,
    wherein said decode means is adapted to decode the image codes generated by said compression means,
    said decode means decodes the image codes which have been already processed according to the one of the plural manners, and
    said process means processes the image data generated by said decode means, in accordance with another manner.

26. An apparatus according to claim 25, wherein said process means processes the image data generated by said decode means and corresponding to plural lines.

27. An apparatus according to claim 25, wherein said process means further comprises buffer memory means which stores the image data generated by said decode means and corresponding to the plural lines.

28. An apparatus according to claim 25, wherein said process means processes the image data generated by said decode means so as to rotate an image.

29. An apparatus according to claim 25, wherein said enter means enters the image codes obtained by compressing the image data of each block of plural blocks obtained by dividing the page of the image data into the plural blocks.

30. An apparatus according to claim 25, wherein said enter means comprises image memory means for storing the page of the image codes.

31. An apparatus according to claim 25, wherein said compression means compresses the image data processed by said process means, before the process of said process means for the page of the image data is completed.

32. An apparatus according to claim 25, wherein said process means processes the image data in first and second manners respectively relating to x- and y-axis directions for the image rotation.

33. An apparatus according to claim 32, wherein said process means further processes the image data in a manner which is to correct an image area in the image rotation.

34. An apparatus according to claim 25, wherein said process means filter processes the image data generated by said decode means.

* * * * *

UNITED STATES PATENT AND TRADEMARK OFFICE
CERTIFICATE OF CORRECTION

PATENT NO. : 4,918,541
DATED : April 17, 1990
INVENTOR(S) : YOSHIHIRO ISHIDA, ET AL.

It is certified that error appears in the above-identified patent and that said Letters Patent is hereby corrected as shown below:

SHEET 1 OF 16

FIG. 1, "CONVERTOR" should read --CONVERTER--.

COLUMN 2

Line 36, "red, (e.g. green and" should read --(e.g. red, green and--.
    Line 40, "compress." should read --compress--.

COLUMN 3

Line 41, "in where" should read --in--.
    Line 42, "(m is an integer" should read --(where m is an integer)--.

COLUMN 4

Lines 45-53, "compressed data ⟶ decoding ⟶ rotation pixel block    original image data ⟶ compression encoding pixel block"

should read

--compressed data ⟶ decoding ⟶ rotation pixel block    original image data

⟶ compression encoding pixel block --.

UNITED STATES PATENT AND TRADEMARK OFFICE
CERTIFICATE OF CORRECTION

PATENT NO. : 4,918,541
DATED : April 17, 1990
INVENTOR(S) : YOSHIHIRO ISHIDA, ET AL.

It is certified that error appears in the above-identified patent and that said Letters Patent is hereby corrected as shown below:

COLUMN 5

Line 36, "an" should be deleted.
    Line 54, "coordinate" should read --coordinates--.

COLUMN 7

Line 4, "(2) - 1" should read --(2) - ①--.
    Line 36, "areacon-" should read --area-con- --.
    Line 38, "X-sense" should read --x-sense--.
    Line 53, "(2) - 1" should read --(2) - ①--.
    Line 67, "becomes" should read --become--.
    Line 68, "become" should read --becomes--.

COLUMN 8

Line 3, "(2) - 1" should read --(2) - ①--.
    Line 15, "CPU8," should read --CPU 8,--.
    Line 55, "$2^2$." should read --$2^2$)--.

COLUMN 9

Line 49, "(4) - 1" should read --(4) - ①--.
    Line 50, "(4) - 2" should read --(4) - ②--.
    Line 51, "(4) - 3" should read --(4) - ③--.
    Line 55, "(4) - 4" should read --(4) - ④--.

UNITED STATES PATENT AND TRADEMARK OFFICE
CERTIFICATE OF CORRECTION

PATENT NO. : 4,918,541

DATED : April 17, 1990

INVENTOR(S) : YOSHIHIRO ISHIDA, ET AL.

Page 3 of 4

It is certified that error appears in the above-identified patent and that said Letters Patent is hereby corrected as shown below:

COLUMN 10

Line 5, "(4) - 3." should read --(4) - ③.--.
    Line 9, "(4) - 4." should read --(4) - ④.--.
    Line 16, "-3 or (4) - 4" should read
        -- -③ or (4) - ④--.
    Line 19, "(6) - 1" should read --(6) - ①--.
    Line 22, "(6) - 2" should read --(6) - ②--.
    Line 24, "(6) - 3" should read --(6) - ③--.
    Line 27, "(6) - 4" should read --(6) - ④--.

COLUMN 14

Line 22, "geberated" should read --generated--.
    Line 66, "where in" should read --wherein--.

COLUMN 15

Line 25, "generated" should read --generating--.
    Line 30, "image code" should read --image codes--.
    Line 41, "A" should read --An--.

UNITED STATES PATENT AND TRADEMARK OFFICE
CERTIFICATE OF CORRECTION

PATENT NO. : 4,918,541

DATED : April 17, 1990

INVENTOR(S) : YOSHIHIRO ISHIDA, ET AL.

It is certified that error appears in the above-identified patent and that said Letters Patent is hereby corrected as shown below:

COLUMN 16

Line 50, "claim 25," should read --claim 28,--.

Signed and Sealed this

Thirtieth Day of October, 1990

*Attest:*

HARRY F. MANBECK, JR.

*Attesting Officer*      *Commissioner of Patents and Trademarks*